United States Patent
Zenger et al.

(10) Patent No.: US 9,836,708 B2
(45) Date of Patent: Dec. 5, 2017

(54) DYNAMIC IDENTIFICATION OF SUPPORTED ITEMS IN AN APPLICATION

(71) Applicant: Visier Solutions, Inc., Vancouver (CA)

(72) Inventors: Geoffrey Zenger, New Westminster (CA); Chuen Yan Sit, Vancouver (CA); Ryan Wayne Hanna, Vancouver (CA)

(73) Assignee: Visier Solutions, Inc., Vancouver, British Columbia ( * ) Notice: Subject to any disclaimer, the term of this patent is extended or adjusted under 35 U.S.C. 154(b) by 61 days.

(21) Appl. No.: 14/106,335

(22) Filed: Dec. 13, 2013

(65) Prior Publication Data

US 2015/0170065 A1 Jun. 18, 2015

(51) Int. Cl.
*G06Q 10/06* (2012.01)

(52) U.S. Cl.
CPC .................. *G06Q 10/063* (2013.01)

(58) Field of Classification Search
CPC .................................................. G06Q 10/063
USPC ........................................................ 705/7.11
See application file for complete search history.

(56) References Cited

U.S. PATENT DOCUMENTS

| | | | | |
|---|---|---|---|---|
| 7,716,592 B2* | 5/2010 | Tien | ............... | G06Q 10/06 715/744 |
| 7,840,896 B2* | 11/2010 | Tien | ............... | G06Q 10/10 715/243 |
| 7,849,048 B2 | 12/2010 | Langseth et al. | | |
| 8,126,750 B2* | 2/2012 | Tien | ............... | G06F 17/30457 705/7.11 |
| 8,209,218 B1 | 6/2012 | Basu et al. | | |
| 8,234,136 B2* | 7/2012 | McDougall | ......... | G06F 17/248 705/342 |
| 8,364,509 B1 | 1/2013 | Marr | | |
| 8,462,922 B2 | 6/2013 | Evans, Jr. et al. | | |
| 2003/0177027 A1 | 9/2003 | DiMarco | | |
| 2006/0053168 A1* | 3/2006 | McDougall | ......... | G06F 17/248 |
| 2007/0016563 A1* | 1/2007 | Omoigui | ............ | G06F 17/3061 |
| 2007/0143174 A1* | 6/2007 | Tien | ............... | G06Q 10/06 705/7.39 |
| 2007/0143175 A1* | 6/2007 | Tien | ............... | G06Q 10/06393 705/7.39 |
| 2007/0156680 A1* | 7/2007 | Tien | ............... | G06F 17/30575 |

(Continued)

FOREIGN PATENT DOCUMENTS

| | | |
|---|---|---|
| EP | 1077420 A2 | 2/2001 |
| WO | 0173588 A2 | 10/2001 |

(Continued)

*Primary Examiner* — Jeffrey Zimmerman
(74) *Attorney, Agent, or Firm* — Toler Law Group, PC

(57) ABSTRACT

Systems and methods of dynamically identifying supported items in an application are described. In one example, an analytics engine receives an indication of available client data, a user's enterprise role, and/or a user's security level. The analytics engine identifies a first subset of supported semantic items (e.g., business topics, business topics, measures, etc.) and a second subset of unsupported semantic items. For example, a semantic item may be supported if corresponding client data is available for analysis and the user's role/security level enable access to the client data. The analytics engine may send data including the supported semantic items and excluding the unsupported semantic items to an application.

18 Claims, 8 Drawing Sheets

(56) References Cited

U.S. PATENT DOCUMENTS

| | | | | |
|---|---|---|---|---|
| 2007/0234198 | A1* | 10/2007 | Tien | G06F 17/241 |
| | | | | 715/205 |
| 2007/0239573 | A1* | 10/2007 | Tien | G06Q 10/06 |
| | | | | 705/35 |
| 2007/0254740 | A1* | 11/2007 | Tien | G06F 17/30457 |
| | | | | 463/42 |
| 2007/0260625 | A1* | 11/2007 | Tien | G06Q 30/00 |
| 2007/0265863 | A1* | 11/2007 | Tien | G06Q 30/00 |
| | | | | 715/825 |
| 2010/0070448 | A1* | 3/2010 | Omoigui | H01L 27/1463 |
| | | | | 706/47 |
| 2012/0150905 | A1* | 6/2012 | Tien | G06F 17/30457 |
| | | | | 707/769 |
| 2012/0197680 | A1* | 8/2012 | Zircher, IV | G06Q 10/063 |
| | | | | 705/7.25 |
| 2012/0296842 | A1* | 11/2012 | McDougall | G06F 17/248 |
| | | | | 705/348 |
| 2013/0007063 | A1* | 1/2013 | Kalra | G06F 17/30893 |
| | | | | 707/796 |
| 2013/0339363 | A1* | 12/2013 | Khosravy | G06F 17/246 |
| | | | | 707/740 |
| 2013/0339379 | A1* | 12/2013 | Ferrari | G06F 17/30457 |
| | | | | 707/766 |

FOREIGN PATENT DOCUMENTS

| | | |
|---|---|---|
| WO | 0213095 A2 | 2/2002 |
| WO | 03010632 A2 | 2/2003 |
| WO | 2004057458 A2 | 7/2004 |
| WO | 2004086160 A1 | 10/2004 |
| WO | 2010045459 A1 | 4/2010 |
| WO | 2012128651 A1 | 9/2012 |

* cited by examiner

GUI displayed by Analytics Client Application
("Retention" item excluded)

*BlueCircle Enterprises*

John Smith ▼

| Topic Guide | Metrics | Dashboards | Snapshots | | |
|---|---|---|---|---|---|
| | All Organizations 7,698 BlueCircle in All Locations | | | | |
| Compensation Expenses | | Diversity Benchmarking (US) | | Employment Costs Benchmarking (US) | | Learning & Development | |
| Leave Management | | Manager Effectiveness | | Organizational Structure | | Pay Equity | |
| Performance Management | | Productivity | | Recruiting Effectiveness | | Retirement | |

FIG. 3

GUI displayed by Analytics Client Application
("Retention" item no longer excluded)

400

*BlueCircle Enterprises*

John Smith ▼

| Topic Guide | Metrics | Dashboards | Snapshots |

Organization
7,698
BlueCircle in All Locations

| Diversity Benchmarking (US) | Employment Costs Benchmarking (US) | Learning & Development |
| Manager Effectiveness | Organizational Structure | Pay Equity |
| Productivity | Recruiting Effectiveness | Retention |

Compensation Expenses

Leave Management

Performance Management

Retirement

DYNAMIC IDENTIFICATION OF SUPPORTED ITEMS IN AN APPLICATION

BACKGROUND

Business enterprises often use computer systems to store and analyze large amounts of data. For example, an enterprise may maintain large databases to store data related to sales, inventory, accounting, human resources, etc. To analyze such large amounts of data, an information technology (IT) department at the enterprise may hire business integrators and consultants to generate enterprise-specific business reports (such as by developing custom reporting software applications). As available data within the enterprise changes, the business integrators and consultants may need to be rehired to modify reports or to build additional reports, leading to further expenditure.

SUMMARY

The present disclosure describes systems and methods of dynamically identifying, from a set of semantic items, a subset of semantic items that are supported by an application. For example, an application may support analysis of a set of semantic items "out-of-the-box." When the application is run by a user, analysis for certain items may be initially unsupported for that user. For example, certain items may be unavailable to the user due to the user's security level or enterprise role. As another example, certain items may be unavailable because data to support a particular item of the application may not be available. When executed, the application may generate business analysis interfaces (e.g., graphical user interfaces (GUIs), dashboards, reports, etc.) that the user has access to and for which data is available. As new data becomes available, or when the security level or enterprise role of the user changes, the described systems and methods may dynamically adjust to include additional items (e.g., business concepts and topics) or to remove items that are no longer available. As a non-limiting example, after an initial testing period, an enterprise may provide the application access to additional systems and databases, such as a recruiting database. In response, the application may include a (previously excluded) "Recruiting Effectiveness" semantic item.

The application relies on a top-down business analysis architecture that identifies available business concepts and questions and then dynamically generates analysis interfaces. This top-down "content-first" approach is in contrast to certain existing "data-first" enterprise practices. In a "data-first" approach, a model is built over data that is stored in an enterprise's databases, and an individual describes a desired report to a consultant and asks the consultant to construct a system to generate the report. By dynamically determining what subset of available concepts and reports are supported, the top-down approach enables out-of-the-box functionality and displays tolerance to data unavailability (e.g., by excluding items for which data is unavailable). The top-down approach may be considered a "content-first" approach because binding to available data is performed after, and not during, model building. In addition, the top-down approach enables dynamic growth in functionality as additional data becomes available without the need to hire expensive consultants and business integrators.

BRIEF DESCRIPTION OF THE DRAWINGS

FIG. 3 illustrates a particular embodiment of a graphical user interface (GUI) generated by an application;

FIG. 4 illustrates another particular embodiment of a GUI generated by an application;

DETAILED DESCRIPTION

Figure 1:
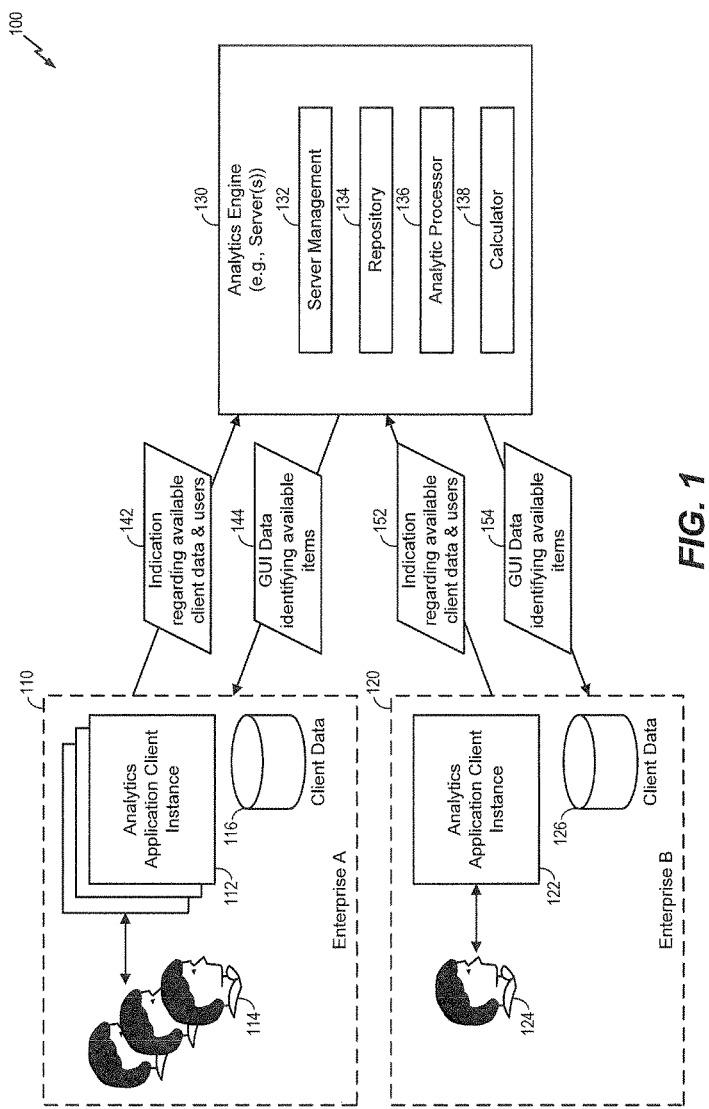
FIG. 1 illustrates a particular embodiment of a system that is operable to identify supported items in an application.

Referring to FIG. 1, a particular embodiment of a system 100 that is operable to identify supported items in an application is shown. For example, the application may be a client application that represents a client portion of a client-server analytics platform. The server portion of the platform is illustrated in FIG. 1 by an analytics engine 130.

In a particular embodiment, the client may be a "thin" client, such as an Internet-accessible web application, that presents graphical user interfaces (GUIs) based on communication with the analytics engine 130. The GUIs may correspond to particular workflows. Multiple instances of the client application may be executed concurrently. Each executing instance of the client application is referred to herein as a "client instance." In FIG. 1, the analytics platform is available to Enterprise A 110 and Enterprise B 120. Each enterprise 110, 120 may represent a company, corporation, or other entity. The Enterprise A 110 is associated with one or more users 114 (e.g., employees) that have the ability to execute one or more client instances 112. At the Enterprise B 120, one or more users 124 (e.g., employees) may execute one or more client instances 122. For example, each of the users 114, 124 may log in to a website or web application corresponding to a client application instance 112, 122 using a browser of a computing device, such as a desktop computer, a laptop computer, a mobile phone, a tablet computer, etc.

Each enterprise 110, 120 may provide the analytics platform (e.g., the client instances 112, 122 and/or the analytics engine 130) access to client data 116, 126. For example, the enterprises 110, 120 may upload the client data 116, 126 to the analytics engine 130. The uploaded data may be "cleaned" (e.g., via data integrity checks and error-correction operations), transformed, and loaded into an in-memory database at the analytics engine 130. Thus, although illustrated in FIG. 1 as being within the enterprises 110, 120, the client data 116, 126 (or at least a copy thereof) may be stored within (or at a location accessible to) the analytics engine 130. The client data 116, 126 may represent internal enterprise data that is analyzed by the analytics platform. For example, when the analytics platform is a workforce analytics platform, the client data 116, 126 may represent internal databases that store data regarding employee compensation, diversity, organizational structure, employee performance, recruiting, employee retention, retirement, etc.

The analytics engine 130 may be configured to receive queries from the client instances 112, 122, execute the queries, and provide results of executing the queries to the client instances 112, 122. In a particular embodiment, the analytics engine 130 includes a server management module 132 that is configured to manage a server environment and provide interfaces to handle requests. For example, the server management module 132 may communicate with the client instances 112, 122. In a particular embodiment, the communication is performed via scripts, servlets, application programming interfaces (APIs) (e.g., a representational state transfer (REST) API), etc. The server management module 132 may also expose services and/or data to the client instances 112, 122. For example, exposed services and data may include query output, session and user account management services, server administration services, etc. The server management module 132 is further described with reference to FIG. 2.

The analytics engine 130 may also include a repository 134. In a particular embodiment, the repository 134 stores models, such as data models and processing models. The models may include query declarations and metric definitions, as further described with reference to FIG. 2. The analytics engine 130 may further include an analytics processor 136 and a calculator 138. The analytics processor 136 may be configured to coordinate lookup and function call operations during query execution, as further described with reference to FIG. 2. The calculator 138 may be configured to access data (e.g., in-memory data cubes) to calculate the value of functions and metrics, as further described with reference to FIG. 2.

When an enterprise acquires access to the analytics platform (e.g., via a purchase, a license, a subscription, etc.), the analytics platform may support analysis regarding a set of semantic items. As used herein, a "semantic item" may be a high-level concept that is associated with one or more terms (or lingo), questions, models, and/or metrics. For example, in the context of workforce analytics, semantic items may be associated with terms such as "employee," "organization," "turnover," etc. The semantic items may also be associated with business questions such as "What is the turnover in the 'Products' organization'?", "What is the 'Cost' of 'Employee' in the 'Sales' organization in 'North America' in 'First Quarter, 2012'?", "How is my 'Cost' 'now' compared to 'the same period last year'?", etc. The semantic items may further be associated with business models, such as models for cost of turnover, indirect sales channel revenue, etc. Semantic items may include metrics or key performance indicators (KPIs), such as revenue per employee, cost per employee, etc.

Although the analytics platform supports analysis for a wide variety of semantic items, not all semantic items may be available to, or appropriate for, a particular user or enterprise. For example, the client data 116 may not include employee retention data, because the Enterprise A 110 does not maintain employee retention data or because the Enterprise A 110 has elected not to provide employee retention data to the analytics platform. In this scenario, analysis regarding employee retention would be unavailable to each of the users 114 at the enterprise 110. As another example, each of the users 114 may have a particular enterprise role (e.g., manager, director, etc.) and/or a particular security level. If analysis for a particular semantic item involves accessing client data 116 that is unavailable to a particular user's enterprise role or security level, then the semantic item may be considered to be unavailable to that particular user.

During operation, to improve user experience and remain tolerant to data unavailability, the analytics engine 130 may dynamically determine what subset of semantic concepts is available to a particular client application instance. For example, when a particular user 114 initiates a particular client instance 112, the client instance 112 may send the analytics engine 130 an indication 142 regarding available client data 116 and the particular user 114. To illustrate, the indication 142 may indicate what database tables and columns are available in the client data 116. The indication 142 may also indicate an enterprise role of the user 114 and/or a security level of the user 114.

The analytics engine 130 may identify, based on the indication 142, a first subset of semantic items that are available and a second subset of semantic items that are unavailable. For example, an "available" semantic item may be a semantic item for which client data 116 is available, provided that the user's enterprise role and security level enable access to such client data 116. An "unavailable" semantic item may be a semantic item for which client data 116 is unavailable or a semantic item that is inaccessible to the user's enterprise role or security level. To illustrate, because most enterprises maintain salary records, a "Compensation Expenses" semantic item may be available to most enterprises out-of-the-box. As another example, a "Manager Effectiveness" semantic item may represent a higher-order "aggregated" or "calculated" semantic item (e.g., business concept). The "Manager Effectiveness" semantic item may be available to users that have a role of "Manager," "Vice-President," and "President," but may be unavailable to users that have a role of "Employee." As another example, a "Retention" semantic item may be unavailable if the client data 116 does not store, or does not provide the analytics engine 130 access to, data regarding employee departures and exit interviews (e.g., reasons for termination).

Upon determining the available semantic items, the analytics engine 130 may send GUI data 144 to the client instance 112. The GUI data 144 may include or identify the available semantic items and may exclude the unavailable semantic items. In a particular embodiment, definitions of all semantic items are stored at the analytics engine 130 and are initially unknown to the client instance 112. The analytics engine 130 may notify the client instance 112 that a particular subset of semantic items are available. The client instance 112 may then send additional request(s) to the analytics engine 130 to obtain definitions of semantic items and associated topics, questions, metrics, etc. Based on received data (e.g., the GUI data 144), the client instance 112 may generate and display analysis GUIs. Examples of such GUIs are further described with reference to FIGS. 3-5. The analytics engine 130 may similarly receive an indication 152 of available client data and users from a particular client instance 122 at the Enterprise B 120, identify a third subset of supported semantic items and a fourth subset of unsupported semantic items, and send GUI data 154 to the client instance 122 identifying the third subset of semantic items and excluding the fourth subset of semantic items.

As client data availability, user roles, and user security levels change, the subsets of available and unavailable semantic concepts also change. For example, although the "Retention" semantic item was initially unavailable, the information technology (IT) department at the Enterprise A 110 may eventually provide access to data regarding employee departures and exit interviews. When the analytics engine 130 receives an indication that such data has become available, the analytics engine 130 may determine that the "Retention" semantic concept is supported and may send GUI data to notify the client instance 112 that interfaces corresponding to "Retention" business questions, metrics, etc. should no longer be excluded from presentation to the users 114. As another example, when a particular user is promoted from "Employee" to "Manager," the "Manager Effectiveness" semantic concept may become available. As yet another example, when a particular user is promoted from "Manager" of the "Sales" department to a "Vice President" position, the user may be allowed to perform analysis on the client data 116 for the enterprise 110 as a whole, instead of being restricted to performing analysis on client data 116 that is specific to the "Sales" department.

The system 100 of FIG. 1 is thus operable to dynamically determine what semantic items are available (e.g., supported and/or permitted) for an application, including adapting to changes in available data and user roles/security levels. It will be appreciated that the system 100 of FIG. 1 presents a top-down business analysis architecture that identifies available items and then dynamically generates analysis interfaces. This top-down "content-first" approach is in contrast to certain existing "data-first" enterprise practices in which a model is built over data that is stored in an enterprise's databases, and an individual describes a desired report to a consultant and asks the consultant to construct a system to generate the report. By dynamically determining what subset of available concepts and reports are supported, the top-down approach enables out-of-the-box functionality and displays tolerance to data unavailability. The top-down approach may be considered a "content-first" approach because binding to available data is performed after, and not during, model building. In addition, the top-down approach enables dynamic growth in functionality as additional data becomes available, without the need to hire consultants and business integrators, and in a manner that is transparent to existing users. Additional data may become available when an enterprise provides the analytics engine 130 with more data, when a user's enterprise role changes, and/or when a user's security level changes.

Figure 2:
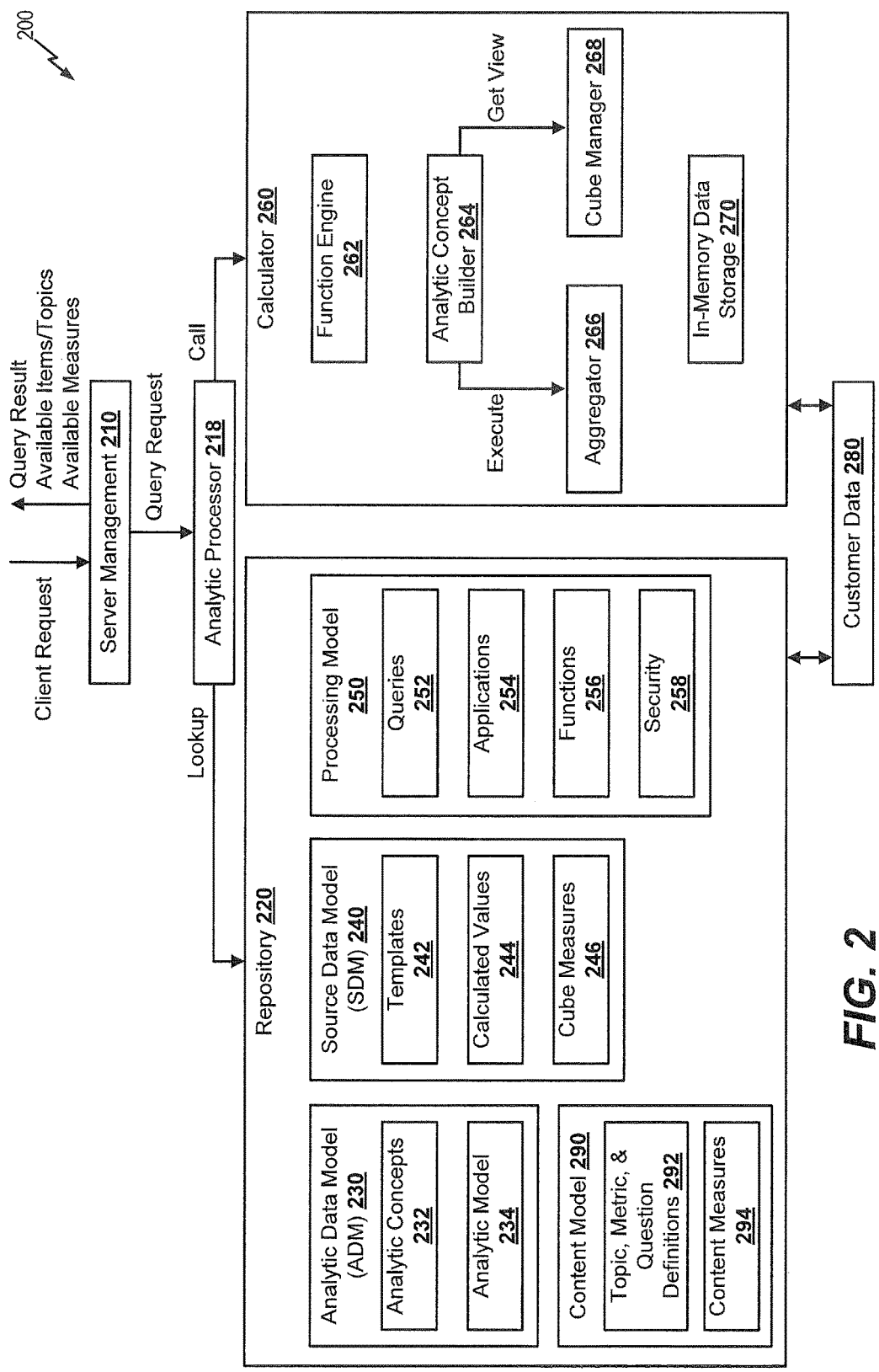
FIG. 2 illustrates a particular embodiment of an analytics engine of the system of FIG. 1.

FIG. 2 is a diagram to illustrate a particular embodiment of an analytics engine 200. In an illustrative embodiment, the analytics engine 200 corresponds to the analytics engine 130 of FIG. 1. The analytics engine 200 may include a server management module 210 (e.g., corresponding to the server management module 132 of FIG. 1), an analytic processor (e.g., corresponding to the analytic processor 136 of FIG. 1), a repository 220 (e.g., corresponding to the repository 134 of FIG. 1), and a calculator 260 (e.g., corresponding to the calculator 138 of FIG. 1). In a particular embodiment, each component of the analytics engine 200 corresponds to hardware and/or software (e.g., processor executable instructions) configured to perform particular functions described herein. In one example, the analytics engine 200 corresponds to a server-side architecture of an analytics platform and is implemented by one or more servers, such as web servers and/or data servers.

The server management module 210 may be configured to manage a server environment and entry points that are exposed to clients, such as the client instances 112, 122 of FIG. 1. In business analysis workflows, client requests may be in the form of query requests, i.e., requests to execute specific queries on client data. The results of executing a specified query may be used by the client instances 112, 122 to generate particular business analysis interfaces, reports, etc.

The analytic processor 218 may be configured to manage various operations involved in query execution. For example, the analytic processor 218 may perform lookup operations with respect to the repository 220 and call (e.g., function call) operations with respect to the calculator 260.

The repository 220 may store various data models and definitions that are referenced during query execution. For example, the repository 220 may store an analytic data model (ADM) 230, a source data model (SDM) 240, a processing model 250, and a content model 290.

The SDM 240 may define a maximal set of dimensions and fact tables that can be constructed from a particular client data set (e.g., the client data 116 or the client data 126 of FIG. 1). A dimension may be a field that can be placed on an axis of a multidimensional data cube that is used to execute a query, as further described herein. For example, "Location" may be a dimension, and members of the "Location" dimension may include "US," "UK," and "Canada." It should be noted that there may be multiple levels of a dimension. For example, one level down, the "US" dimension may include the members "Texas," "New York," and "California." A fact table may be a collection of facts, where facts correspond to data points (e.g., database entries) and occupy the cells of a multidimensional data cube.

In addition to dimensions and fact tables, the SDM 240 may include fact table templates 242, calculated values 244, and cube measures 246 (alternately referred to as "fact table measures"). The fact table templates 242 may define a maximal set of dimensions, measures, and calculated values that can be used to construct a particular multidimensional data cube. The calculated values 244 may be represented by functions that accept a fact as input and output a calculated value to be appended to that fact. For example, given the value "Salary" in a fact table, a "Ten times Salary" calculated value may append a value to each fact equal to ten times the value of the "Salary" of that fact. As another example, "Tenure" may be a calculated value that does not exist in client data as a static value. Instead, a "Tenure" calculated value may accept an employee hire date and a specified date as input and may return a value representing the employee's tenure on the specified date. The cube measures 246 may be functions that accept a set of facts as input and output a value. For example, given all employees in Canada as input, a "Sum of Salary" measure may output the sum of salaries of all Canadian employees. As another example, a "Count" measure may count all of the facts in a set of cells and return the count. Measures that represent a performance assessment (e.g., key performance indicators (KPIs)) are also referred to herein as metrics.

The ADM 230 may include analytic concepts 232 and an analytic model 234. The analytic concepts 232 may be functions that accept an application context as input and output a set of dimension members. In a particular embodiment, application context may be dynamically adjusted by a user, as further described with reference to FIG. 3. The analytic model 234 may represent a set of mathematical formulae that can be used during query execution, as further described herein.

The processing model 250 may include query definitions 252, application data 254, function declarations 256, and security modules 258. Each query may be associated with a query definition 252 that includes a set of function calls, measures, and parameter values. The query definition 252 may thus define an execution path to be used by the analytic processor 218 to generate the result of the query. In a particular embodiment, queries may be classified as analytic queries or data connectors. Analytic queries may not be executable until all required fact tables are available. In contrast, data connector queries may be executed independent of fact table availability and may be used to populate fact tables. For example, a data connector query may be executed to load data into in-memory data storage 270 from a database, a web service, a spreadsheet, etc.

To illustrate, "Cost of Turnover" may be a business concept that returns a scalar value as a result. A "Cost of Turnover" query may accept the result of a "Turnover" query as input, and the "Turnover" query may accept an "Organization" and a "Date Range" as input. Thus, a query that computes that the Cost of Turnover for a Product Organization during the 2011-2012 year is $373,000 may be represented as:

Cost of Turnover(Turnover(Organization("Product", "2011-2012")))=$373,000 where "Product" and "2011-2012" are parameters and "Organization" and "Turnover" are analytic queries. Thus, higher-order business concepts, such as "Cost of Turnover," may be bound to queries that can be chained together. The query definitions 252 may include definitions for such lower-order and higher-order queries.

The application data 254 may be maintained for each client instance (e.g., the client instances 112, 122 of FIG. 1). The application data 254 for a specific client instance may include server configurations and security policies for the client instance. The application data 254 for a specific client instance may also include a source data model, an analytic data model, and a processor model for the client instance. When the client instance is initialized by a user, the analytics engine 200 may use the application data 254 for the client instance and the user to determine what databases are available and what data should be loaded into the in-memory data storage 270 by data connector queries.

The function declarations 256 may be associated with functions called by the analytic processor 218. For example, the functions may include data transformations or aggregation functions, such as functions to execute a formula, to execute a computation over data representing a calendar year, etc. The functions may also include fetch functions, such as structured query language (SQL) fetch, web service fetch, spreadsheet fetch, etc. The functions may further include exporting functions, such as spreadsheet export and SQL export, and custom (e.g., user defined) functions.

The security modules 258 may implement query security and organizational security. In a particular embodiment, to implement query security, each measure (e.g., cube measure 246 and/or content measure 294) may be bound to one or more queries 252 and each user may have a particular security level and/or enterprise role. Different security levels and enterprise roles may have access to different measures. Prior to execution of a query, the security modules 258 may determine whether the user requesting execution of the query meets a minimum security level/enterprise role required to access the measures bound to the query. If the user does not meet the requirements, the analytics engine 200 may return an error message to the requesting client instance.

Organizational security may be applied on the basis of the organization(s) that a user has access to. For example, the manager of the "Products" organization may have access to products-related information, but may not have access to a "Legal" organization. For an organization at a particular point in time, the security modules 258 may grant a user access to information for the user's organization and all organizations beneath the user's organization.

The content model 290 may include definitions 292 for topics and metrics. For example, in the context of workforce analytics, the definitions 292 may include definitions for various human resources (HR) topics and metrics, as well as definitions for questions and analytic concepts associated with such topics and metrics. The content model 290 may also include definitions for content measures 294. Whereas the cube measures 246 are defined with respect to a cube, the content measures 294 may be derived from or built upon a cube measure. For example, given the "Sum of Salary" cube measure described above, a "Sum of Salaries of Employees 50 years or older" content measure can be derived from or built upon the "Sum of Salary" cube measure. Various topics, metrics, and/or questions defined in the definitions 292 may reference the "Sum of Salaries of Employees 50 years or older" content measure.

The calculator 260 may include a function engine 262, an analytic concept builder 264, an aggregator 266, a cube manager 268, and the in-memory data storage (e.g., random access memory (RAM)) 270. The function engine 262 may be used by the analytic processor 218 to load and execute the functions 256. In a particular embodiment, the function engine 262 may also execute user-defined functions or plug-ins. A function may also recursively call back to the analytic processor 218 to execute sub-functions.

When a query requires a set of values corresponding to different dates (e.g., to generate points of a trend chart), the function engine 262 may split a query into sub-queries. Each sub-query may be executed independently. Once results of the sub-queries are available, the function engine 262 may combine the results to generate an overall result of the original query (e.g., by using a "UnionOverPeriod" function). The overall result may be returned to the requesting client instance via the server management module 210.

The analytic concept builder 264 may be a processing function called by the analytic processor 218 to communicate with the calculator 260. If a particular query cannot be evaluated using a single multidimensional cube operation, the query may be split into smaller "chunk" requests. Each chunk request may be responsible for calculating the result of a chunk of the overall query. The analytic concept builder 264 may call back to the analytic processor 218 with chunk requests, and the calculator 260 may execute the chunk requests in parallel. Further, when a large amount of client data is available, the client data may be divided into "shards." Each shard may be a subset of the client data that matches a corresponding filter (e.g., different shards may include data for different quarters of a calendar year). Shards may be stored on different storage devices (e.g., servers) for load-balancing purposes. If a query requests values that span multiple shards (e.g., a query that requests data for a calendar year), the analytic concept builder 264 may split the query into chunk requests and call back into the analytic processor 218 with a chunk request for each shard.

The cube manager 268 may generate, cache, and lookup cube views. A "cube view" includes a multidimensional cube along with one or more constraints that provide semantics to the cube. For example, given a cube containing all employee states at all times, the constraint "Date=2012-07-01" can be added to the cube to form a cube view representing the state of all employees as of Jul. 1, 2012. The cube manager 268 may receive a request for a particular cube view from the analytic concept builder 264. If the requested cube view is available in cache, the cube manager 268 may return the cached cube view. If not, the cube manager 268 may construct and cache the cube view prior to returning the constructed cube view. A cache management policy (e.g., least recently used, least frequently used, etc.) may be used to determine when a cached cube view is deleted from the cache.

The analytic concept builder 264 may also call into the aggregator 266. When called, the aggregator 266 may determine what cube views, dimensions members, and measures are needed to successfully perform a particular calculation. The aggregator 266 may also calculate results from cube views and return the results to the analytic concept builder 264.

The in-memory data storage 270 may store client data being used during query execution. For example, client data may be loaded into the in-memory data storage 270 using data connector queries called by the analytic processor 218. The in-memory data storage 270 can be considered a "base" hypercube that includes a large number of available dimensions, where each dimension can include a large number of members. In a particular embodiment, the base cube is an N-dimensional online analytic processing (OLAP) cube.

During operation, the analytics engine 200 may execute queries in response to requests from client instances. For example, a user may log in to a client instance and navigate to a report that illustrates Turnover Rate for a Products organization in Canada during the first quarter of 2011. The client instance may send a query request for a "Turnover Rate" analytic query to be executed using the parameters "Products," "Canada," and "First Quarter, 2011." The server management module 210 may receive the query request and may forward the query request to the analytic processor 218.

Upon receiving the query request, the analytic processor 218 may verify that the user has access to the Turnover Rate query and employee turnover data for the Products organization in Canada. If the user has access, the analytic processor 218 may verify that the employee turnover data is loaded into the in-memory data storage 270. If the employee turnover data is not loaded, the analytic processor 218 may call one or more data connector queries to load the data into the in-memory data storage 270.

When the data is available in the in-memory data storage, the analytic processor 218 may look up the definition of the Turnover Rate query in the repository 220. For example, the definition of the Turnover Rate query may include a rate processing function, an annualization processing function, a sub-query for the number of turnovers during a time period, and a sub-query for average headcount during a time period. The function engine 262 may load the rate and annualization processing functions identified by the query definition.

Once functions are loaded, the analytic processor 218 may call the analytic concept builder 264 to generate cube views. For example, the analytic concept builder 264 may request the cube manager 268 for cube views corresponding to headcount and turnover count. The cube manager 268 may return the requested cube views from cache or may construct the requested cube views.

The analytic concept builder 264 may execute any required analytic concepts and call into the aggregator 266 to generate result set(s). For the Turnover Rate query, two result sets may be generated in parallel—a result set for average head count and a result set for number of turnover events. For average headcount, the aggregator 266 may call a measure to look into the "Canada" member of the Locations dimension, the "Products" member of the organizations dimension, and "2010-Dec. 31," "2011-Jan. 31," "2011-Feb. 28," and "2011-Mar. 31" of the time dimension to get four result values. The four result values may represent the headcount of the Products Organization in Canada on the last day of December 2010, January 2011, February 2011, and March 2011. The aggregator 266 may pass the four values to the analytic concept builder 264. To illustrate, the four values may be 454, 475, 491, and 500.

Similarly, for turnover count, the aggregator 266 may call a measure to look into the "Canada" member of the Locations dimension, the "Products" member of the organizations dimension, and "2011-01," "2011-02," and "2011-03" of the time dimension to get a result value. The three result values may represent the total number of turnover events in the Products Organization in Canada during the months of January 2011, February 2011, and March 2011. The aggregator 266 may pass a sum of the result values to the analytic concept builder 264. To illustrate, the sum may be 6.

The analytic concept builder 264 may pass the received values to the analytic processor 218, which may call processing functions to calculate the query result. For example, the analytic processor 218 may call the rate processing function to determine the rate is 1.25% (turnover/average head count=6/480=0.0125). The analytic processor 218 may then call the annualization processing function to determine that the annualized turnover rate is 5% (1.25%*4 quarters=5%). The analytic processor 218 may return the query result of 5% to the client instance via the server management module 210.

It should be noted that the foregoing description, which relates to executing an analytic query to generate a single value, is for example only and not to be considered limiting. Multidimensional queries may also be executed by the analytics engine 200. For example, a user may set his or her application context to "All Organizations" in "Canada" during "2011." The user may then view a distribution chart for Resignation Rate and select groupings by "Age," "Location," and "Gender." To generate the chart, a multidimensional query may be executed by the analytics engine 200. Thus, queries may be executed to retrieve a set of data, not just a single value.

In a particular embodiment, the analytics engine 200 is configured to identify semantic items that are available to a particular client instance. To illustrate, the SDM 240 may define the maximal set of fact tables, dimensions, and semantic items that are available out-of-the-box. When client data is provided to the analytics engine 200, a "table_info" table may be constructed to indicate which columns in each fact table are non-empty (e.g., are populated with available client data). The "table_info" table may be used to filter out dimensions, measures, and calculated values that do not have available data. Upon detecting startup of a client instance by a user, the analytics engine 200 may perform a trial evaluation of each content measure bound to each query to determine if the content measure is computable. A content measure may be determined to be computable if client data is available for the content measure and the user's role/security level enables access to the client data. In a particular embodiment, data identifying the subset of computable measures is cached and reused unless available client data changes or the user's role/security level changes.

Once the subset of computable measures is determined, the analytics engine 200 may determine which semantic items (e.g., business topics, business questions, reports, etc.) are available for the user by iterating over the maximal set of semantic items and determining which semantic items are supported. A semantic item may be determined to be supported if each measure for the semantic item is computable. The analytics engine 200 may send data identifying the subset of supported semantic items and/or the subset of computable measures to the client instance.

The analytics engine 200 of FIG. 2 may thus provide a server-side system to execute various queries on client data. Results of query execution may be used by a client instance to generate reports and visualizations. The analytics engine 200 may also dynamically determine which semantic items are supported for a given user based on data availability and user role/security level, and the analytics engine 200 may provide data identifying the supported semantic items to a client instance for use in generating analysis interfaces, as further described with reference to FIGS. 3-5.

Referring to FIG. 3, a particular embodiment of a graphical user interface (GUI) 300 generated by an application is shown. In an illustrative embodiment, the GUI 300 is generated by the client instances 112, 122 of FIG. 1.

In the GUI 300, a topic guide tab 301 is selected. The topic guide may present a high-level list of semantic items (e.g., business topics) that are available for the user John Smith (as indicated at 302), who is an employee of the company BlueCircle Enterprises (as indicated at 303). The GUI 300 also indicates an application context 304. In the illustrated example, the application context is "All Organizations" of BlueCircle Enterprises in "All Locations." The application context corresponds to a population of 7,698 employees. As the user (John Smith) changes the application context (e.g., changes the "Location" dimension from "All Locations" to "Canada," changes the "Organization" dimension from "All Organizations" to "Legal," etc.), the population may be dynamically updated. The application context 304 may represent a filter or set of filters that is used during query execution.

In FIG. 3, the topic guide includes topics for compensation expenses, diversity benchmarking, employment costs benchmarking, learning and development, leave management, manager effectiveness, organizational structure, pay equity, performance management, productivity, recruiting effectiveness, and retirement. Thus, BlueCircle Enterprises has client data available for the aforementioned topics and John Smith's role and security level enables access to the client data for the aforementioned topics. If client data for a certain topic is unavailable, or if John Smith's role or security level prohibits access to the client data for a certain topic, then the GUI 300 excludes the topic. For example, the GUI 300 excludes a "Retention" topic. The "Retention" topic may be excluded because BlueCircle does not maintain employee retention data, because BlueCircle has not made employee retention data available to the analytics platform, or because John Smith's security level or enterprise role does not allow access to employee retention data.

FIG. 4 depicts another particular embodiment of a GUI 400. In contrast to FIG. 3, the GUI 400 of FIG. 4 includes the "Retention" topic, as shown at 410. To illustrate, client data for the Retention topic may have become available, or John Smith's role/security level may have become elevated such that access to the client data has been allowed. In response to such an update, an analytics engine (e.g., the analytics engine 130 of FIG. 1 or the analytics engine 200 of FIG. 2) may determine that the "Retention" topic should no longer be excluded from the GUI 400. Thus, as additional data becomes available and employee roles/security levels change over time, the described analytics platform grows in functionality.

Figure 5:
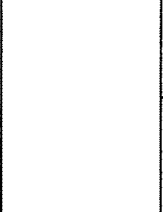
FIG. 5 illustrates another particular embodiment of a GUI generated by an application.

FIG. 5 depicts another particular embodiment of a GUI 500. In contrast to FIG. 3, the GUI 500 of FIG. 5 excludes the "Recruiting Effectiveness" topic as well as the "Retention" topic. To illustrate, client data for the "Recruiting Effectiveness" topic may have become unavailable, or John Smith's role/security level may have changed such that access to the client data has become disallowed. In response to such an update, an analytics engine (e.g., the analytics engine 130 of FIG. 1 or the analytics engine 200 of FIG. 2) may determine that the "Recruiting Effectiveness" topic should no longer be included in the GUI 500. Thus, when data becomes unavailable and employee roles/security levels change over time, the described analytics platform adapts in functionality.

Figure 6:
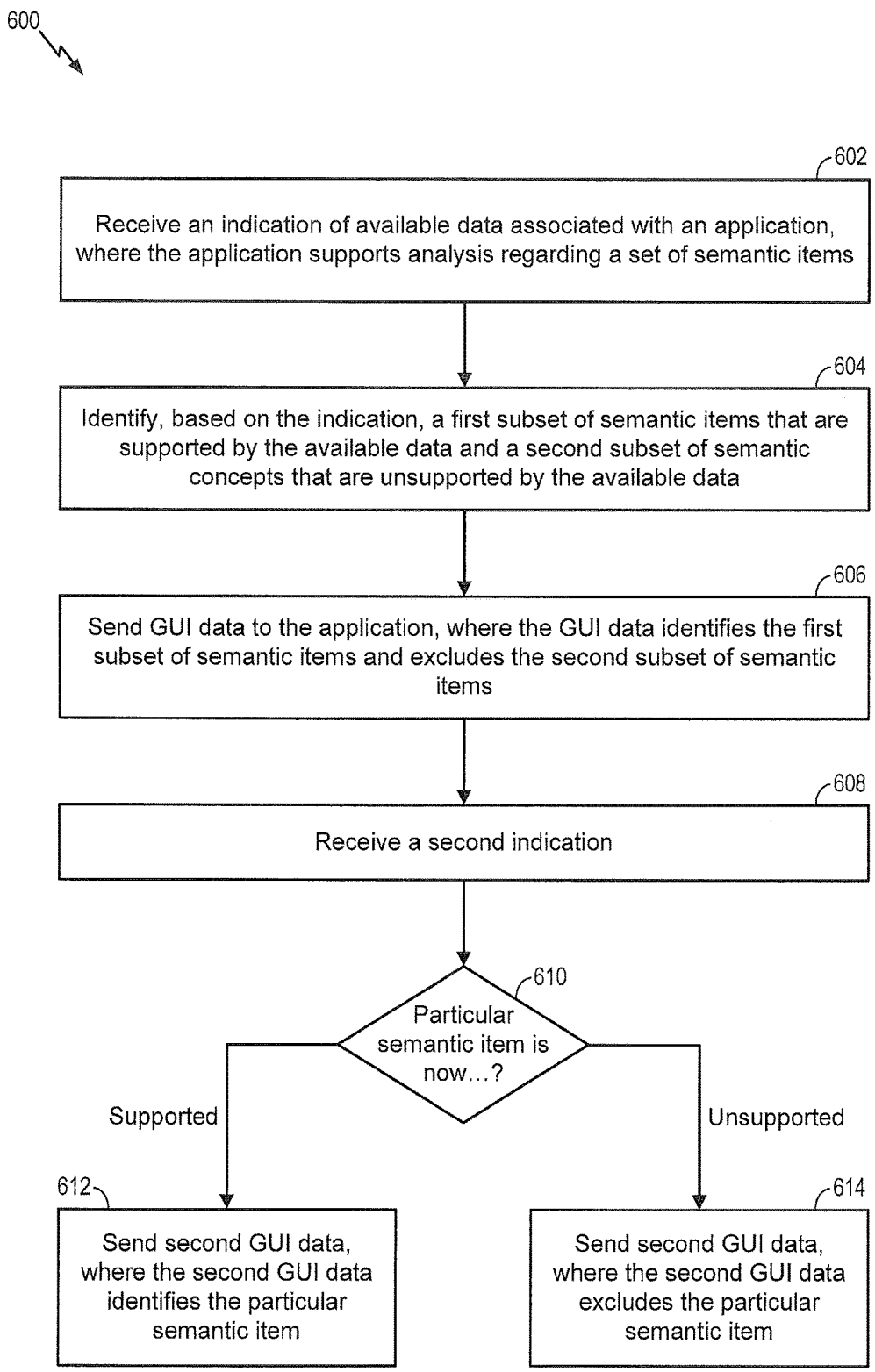
FIG. 6 is a flowchart that illustrates a particular embodiment of a method of identifying supported items in an application based on available data.

Referring to FIG. 6, a flowchart illustrates a particular embodiment of a method 600 of identifying supported items in an application based on available data. In an illustrative embodiment, the method 600 may be performed by the analytics engine 130 of FIG. 1 or the analytics engine 200 of FIG. 2.

The method 600 may include receiving an indication of available data associated with an application, at 602. The application may support analysis regarding a set of semantic items. For example, in FIG. 1, the analytics engine 130 may receive the indication 142 from the analytics client application instance 112. To illustrate, the complete set of semantic items may include each of the semantic items shown in FIG. 3 and the "Retention" item.

The method 600 may also include identifying, based on the indication, a first subset of semantic items that are supported by the available data and a second subset of semantic items that are unsupported by the available data, at 604. In a particular embodiment, the supported semantic items may be determined based on determining what measures or metrics are computable, as described with reference to FIG. 8. To illustrate, the first subset of supported semantic items may include each of the semantic items shown in FIG. 3, and the second subset of unsupported semantic items may include the "Retention" item. Advancing to 606, the method 600 may include sending GUI data to the application. The GUI data may identify the first subset of semantic items and may exclude the second subset of semantic items. For example, in FIG. 1, the analytics engine may send the GUI data 144 to the client instance 112. In an illustrative embodiment, the GUI data includes, corresponds to, or can be used to generate interfaces such as those shown in FIGS. 3-5.

The method 600 may further include receiving a second indication, at 608. For example, referring to FIG. 1, the analytics engine 130 may receive a second indication when additional client data 116 becomes available, previously available client data 116 becomes unavailable, when a role or security level of the user 114 changes, or any combination thereof. The method 600 may include determining, at 610, whether a particular semantic item has become supported or unsupported. For example, a previously unsupported semantic item may become supported when additional client data becomes available.

When a particular semantic item has become supported, the method 600 may include sending second GUI data to the client instance, where the second GUI data identifies (i.e., no longer excludes) the particular semantic item, at 612. For example, if the "Retention" item becomes supported, a user may be shown the GUI 400 of FIG. 4 instead of the GUI 300 of FIG. 3. When a particular semantic item has become unsupported, the method 600 may include sending second GUI data excluding the particular semantic item to the client instance, at 614. For example, if the "Recruiting Effectiveness" item becomes unsupported, a user may be shown the GUI 500 of FIG. 5 instead of the GUI 300 of FIG. 3. The method 600 of FIG. 6 may thus be used to dynamically determine supported semantic items based on client data availability. In some embodiments, a client instance may not be provided with the second GUI data each time new data is available. Instead, a client instance may be provided with the second GUI data in response to a request for available semantic items (e.g., the next time a user logs in to the client instance).

Figure 7:
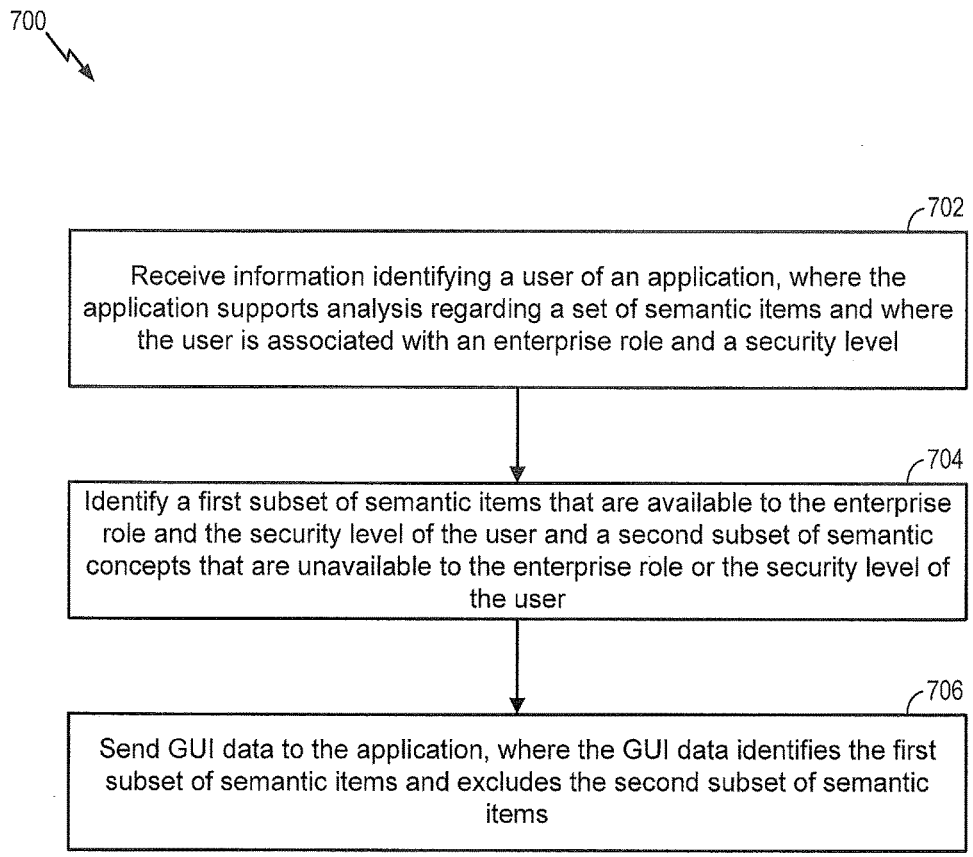
FIG. 7 is a flowchart that illustrates a particular embodiment of a method of identifying supported items in an application based on a user's enterprise role and/or security level.

Supported semantic items may also be determined based on user role/security level. For example, FIG. 7 depicts a flowchart that illustrates a particular embodiment of a method 700 of identifying supported items in an application based on a user's enterprise role and/or security level. In an illustrative embodiment, the method 700 may be performed by the analytics engine 130 of FIG. 1 or the analytics engine 200 of FIG. 2.

The method 700 may include receiving information identifying a user of an application, at 702. The application may support analysis regarding a set of semantic items and the user may be associated with an enterprise role and a security level. For example, referring to FIG. 1, the analytics engine 130 may receive the indication 142, where the indication 142 identifies an enterprise role and a security level of the user 114.

The method 700 may also include identifying a first subset of semantic items that are available to the enterprise role and the security level of the user and a second subset of semantic items that are unavailable to the enterprise role or the security level of the user, at 704. In a particular embodiment, the supported semantic items may be determined based on the method described with reference to FIG. 8. Advancing to 706, the method 700 may include sending GUI data to the application. The GUI data may identify the first subset of semantic items and may exclude the second subset of semantic items. For example, referring to FIG. 1, the analytics engine 130 may send the GUI data 144 to the client instance 112.

It should be noted that although the methods of FIGS. 6 and 7 are illustrated separately, this is for example only and not to be considered limiting. In particular embodiments, the results of step 604 in FIG. 6 (semantic items supported by available data) and the results of step 704 in FIG. 7 (semantic items available to a user's enterprise role and security level) are intersected, and the result of an intersection operation represents the semantic items for which interfaces may be generated by the client instance.

Figure 8:
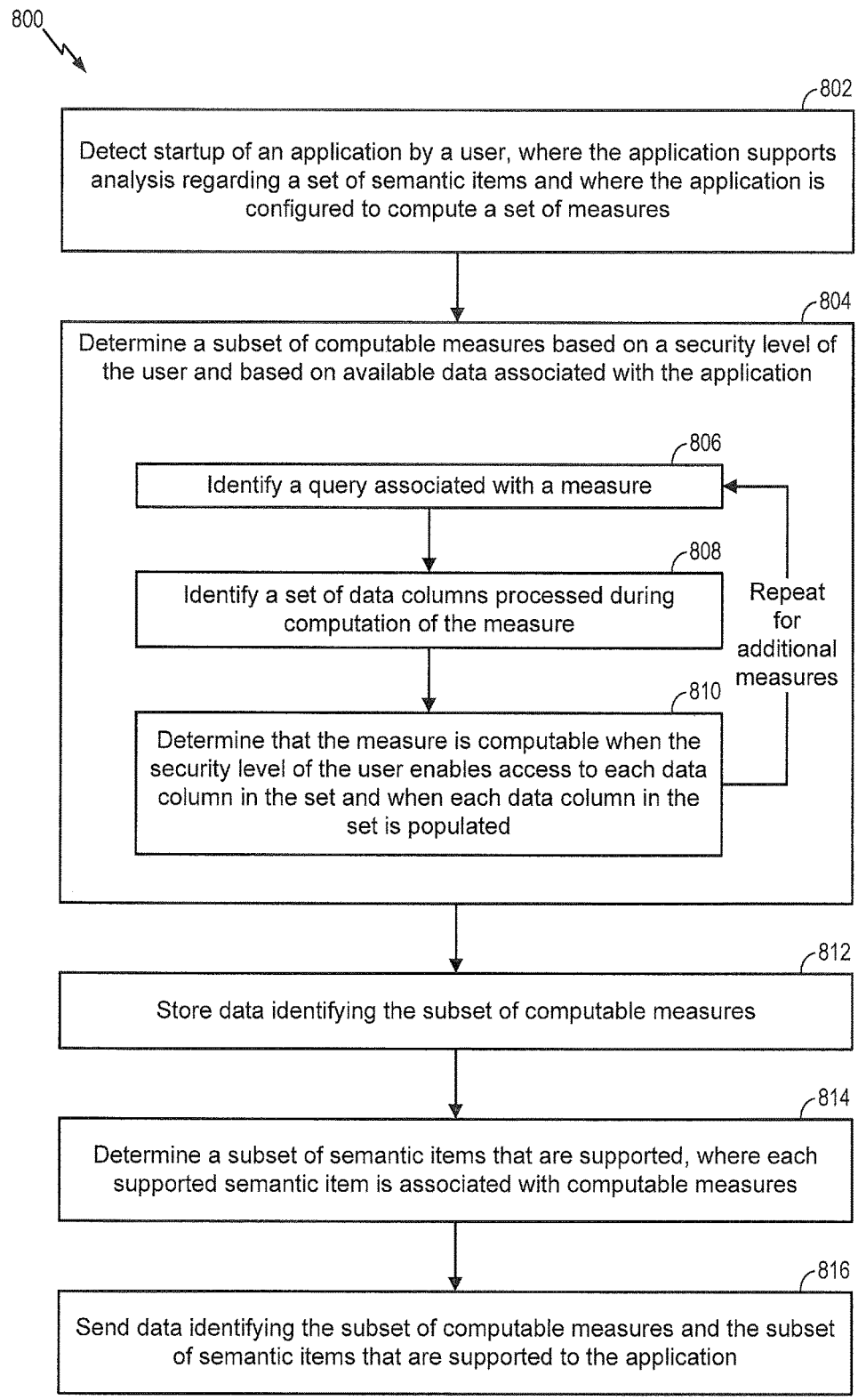
FIG. 8 is a flowchart that illustrates a particular embodiment of a method of identifying supported items in an application based on computability of measures.

Referring to FIG. 8, a flowchart illustrates a particular embodiment of a method 800 of identifying supported items in an application based on computability of measures. In an illustrative embodiment, the method 800 may be performed by the analytics engine 130 of FIG. 1 or the analytics engine 200 of FIG. 2.

The method 800 may include detecting startup of an application by a user, at 802. The application may supports analysis regarding a set of semantic items and may be configured to compute a set of measures. For example, referring to FIG. 2, the analytic engine 200 may detect startup of a client instance by a user based on receiving a request from the client instance for a list of available topics and/or measures (or metrics). Alternately, or in addition, startup of a client instance may be detected based on a user logging in to a web application, a server, software as a service (SaaS), etc.

The method 800 may also include determining a subset of computable measures, at 804. The subset of computable measures may be determined based on the user and based on available data. For example, determining whether a particular measure is computable may include identifying a query associated with the measure, at 806, and identifying a set of data columns processed during computation of the measure, at 808. Proceeding to 810, the measure may be determined to be computable when the security level of the user enables access to each of the data columns and where each of the data columns is populated (e.g., non-empty). The steps 806-810 may be repeated for additional measures until a subset of all computable measures is determined. For example, referring to FIG. 2, the analytic engine 200 may identify a maximal set of queries 252 from the processing model 250 and may identify the content 294 bound to each query. The analytic engine 200 may also perform a "dry run" of each content measure to determine which measures are computable and which content measures return an error because the security module 258 determines that the user's security level is insufficient or because the analytic concept builder determines that the necessary client data is unavailable.

The method 800 may further include storing (e.g., caching) data identifying the subset of computable content measures, at 812. Continuing to 814, the method 800 may include determining a subset of semantic items that are supported. Each supported semantic item may be associated with only computable content measures. For example, referring to FIG. 2, the analytic engine 200 may iterate over the maximal set of semantic items and filter out semantic items that are associated with at least one incomputable content measure 294.

The method 800 may include sending data identifying the subset of computable measures and the subset of semantic items to the application, at 816. For example, referring to FIG. 2, the server management module 210 may send a list of available topics and available measures to a client instance.

In accordance with various embodiments of the present disclosure, the methods, functions, and modules described herein may be implemented by software programs executable by a computer system. Further, in an exemplary embodiment, implementations can include distributed processing, component/object distributed processing, and parallel processing. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, a set-top box, a media player, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-8. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

In a particular embodiment, a method includes receiving, at a computing device including a processor, an indication of available data associated with an application. The application supports analysis regarding a set of semantic items. The method also includes identifying, based on the indication, a first subset of semantic items that are supported by the available data and a second subset of semantic items that are unsupported by the available data. The method further includes sending GUI data to the application, where the GUI data identifies the first subset of semantic items and excludes the second subset of semantic items.

In another particular embodiment, a computer-readable storage device stores instructions that, when executed by a computer, cause the computer to perform operations including detecting startup of an application by a user. The application supports analysis regarding a set of semantic items, and the application is configured to compute a set of measures. The operations also include determining a subset of computable measures based on a security level of the user and based on available data associated with the application. The operations further include determining a subset of semantic items that are supported, wherein each supported semantic item is associated with computable measures and sending data identifying the subset of semantic items that are supported to the application. Determining whether a particular measure is supported may include identifying a query associated with the particular measure, identifying a set of data columns processed during computation of the particular measure, and determining that the particular measure is computable when the security level of the user enables access to each data column in the identified set of data columns and when each data column in the identified set of data columns is populated.

In another particular embodiment, an apparatus includes a processor and a memory storing instructions that, when executed by the processor, cause the processor to perform operations including receiving information identifying a user of an application. The application supports analysis regarding a set of semantic items. The operations also include identifying a first subset of semantic items that are available to the user and a second subset of semantic items that unavailable to the user. The operations further include sending GUI data to the application, where the GUI data identifies the first subset of semantic items and excludes the second subset of semantic items.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method of generating graphical user analysis interfaces, the method comprising:
    at an analytics engine configured to analyze a set of items based on data models and processing models:
        receiving, at a first time, a first indication that first client data is available for use by the analytics engine, wherein a first portion of the first client data is stored on a first data storage device, wherein a second portion of the first client data is stored on a second data storage device that is distinct from the first data storage device, and wherein the analytics engine is configured to analyze the first client data using the set of items;
        populating columns of a plurality of fact tables with the first client data;
        populating and storing a table-info table to indicate which columns in each of the plurality of fact tables are populated with the first client data;
        evaluating a plurality of content measures based on the populated columns of the plurality of fact tables, the table-info table, and at least one of a role or a security access level of a user to determine and store a set of computable content measures that are supported by the first client data;
        identifying supported items of the set of items based on the stored set of computable content measures;
        sending first graphical user interface (GUI) data to a client instance, wherein display of the first GUI data shows the supported items and excludes unsupported items;
        receiving, at a second time, a second indication that a portion of the first client data has become unavailable;

determining that at least one of the supported items relies on the portion of the first client data;

sending second GUI data to the client instance, wherein display of the second GUI data excludes the at least one of the supported items;

receiving, from the client instance, a query that requests values spanning both the first portion and the second portion; and responsive to receiving the query, dividing the query into a plurality of data requests, the plurality of data requests including a first request with respect to the first portion and a second request with respect to the second portion.

2. The method of claim 1, wherein the set of items includes at least one business term, at least one business concept, at least one business question, at least one business model, at least one business measure, or any combination thereof.

3. The method of claim 1, wherein the client instance corresponds to a particular enterprise client.

4. The method of claim 1, wherein execution of the client instance is initiated by the user.

5. The method of claim 1, wherein display of the first GUI data excludes one or more items based on an association of the user with a particular enterprise client.

6. The method of claim 1, wherein the user is associated with a first enterprise client, and further comprising:

receiving a third indication that second client data associated with a second enterprise client is available for use by the analytics engine;

evaluating the plurality of content measures based on the second client data and at least one of a role or a security access level of a second user to determine a second set of computable content measures that are supported by the second client data, wherein the second user is associated with the second enterprise client;

identifying second supported items of the set of items and second unsupported items of the set of items based on the second set of computable content measures; and sending third GUI data to a second client instance, wherein display of the third GUI data shows the second supported items and excludes the second unsupported items.

7. The method of claim 1, wherein a first portion of the first client data is stored on a first data storage device, wherein a second portion of the first client data is stored on a second data storage device that is distinct from the first data storage device, and further comprising, responsive to a receiving query that spans both the first portion and the second portion, dividing the query into a plurality of data requests, the plurality of data requests including a first request with respect to the first portion and a second request with respect to the second portion.

8. The method of claim 1, wherein the stored set of computable content measures is reusable to identify the supported items while the first client data remains available and while the at least one of the role or the security access level of the user is unchanged.

9. The method of claim 1, further comprising:

receiving a third indication that second client data is available for use by the analytics engine;

populating, at a third time, the table-info table to indicate which of the columns in the plurality of fact tables are populated with the second client data;

evaluating, at the third time, the plurality of content measures based on the second client data and table-info table;

determining that at least one previously unsupported item is supported by the second client data; and sending third GUI data to the client instance, wherein display of the third GUI data shows the at least one previously unsupported item that is supported by the second client data.

10. The method of claim 9, wherein the third time is subsequent to at least one of the first time or the second time.

11. A non-transitory computer-readable storage device storing instructions that, when executed by a computer, cause the computer to perform operations comprising:

detecting startup of one or more applications in an analytics engine configured to analyze a set of items based on data models and processing models to dynamically generate graphical user analysis interfaces;

populating columns of a plurality of fact tables with first client data, wherein a first portion of the first client data is stored on a first data storage device, and wherein a second portion of the first client data is stored on a second data storage device that is distinct from the first data storage device;

populating and storing a table-info table to indicate which columns in each of the plurality of fact tables are populated with the first client data;

evaluating a plurality of content measures based on the populated columns of the plurality of fact tables, the table-info table, and at least one of a role or a security access level of a user to determine and store a set of computable content measures that are supported by the first client data;

identifying supported items of the set of items based on the stored set of computable content measures;

sending data identifying the supported items to the one or more applications, wherein the data excludes unsupported items;

receiving an indication that a portion of the first client data has become unavailable;

determining that at least one of the supported items relies on the portion of the first client data;

sending second data to the one or more applications, wherein display of the second data excludes the at least one of the supported items;

receiving, from the one or more applications, a query that requests values spanning both the first portion and the second portion, and responsive to receiving the query, dividing the query into a plurality of data requests, the plurality of data requests including a first request with respect to the first portion and a second request with respect to the second portion.

12. The non-transitory computer-readable storage device of claim 11, wherein the operations further comprise sending data identifying the set of computable content measures to the one or more applications.

13. The non-transitory computer-readable storage device of claim 11, wherein the stored set of computable content measures is reusable to identify the supported items while the first client data remains available and while the at least one of the role or the security access level of the user is unchanged.

14. An apparatus comprising:

a processor configured to analyze a set of items based on data models and processing models to dynamically generate graphical user analysis interfaces; and a memory storing instructions that, when executed by the processor, cause the processor to perform operations comprising:

receiving, at a first time, first information identifying first client data available for use by the processor to support analysis of the first client data based on the set of items, wherein a first portion of the first client data is stored on a first data storage device, and wherein a second portion of the first client data is stored on a second data storage device that is distinct from the first data storage device;

populating columns of a plurality of fact tables with the first client data;

populating and storing a table-info table to indicate which columns in each of the plurality of fact tables are populated with the first client data;

evaluating a plurality of content measures based on the populated columns of the plurality of fact tables, the table-info table, and at least one of a role or a security access level of a user to determine and store a set of computable content measures that are supported by the first client data;

identifying supported items of the set of items based on the stored set of computable content measures;

sending first graphical user interface (GUI) data to a client instance, wherein display of the first GUI data shows the supported items and excludes unsupported items;

receiving, at a second time, second information that a portion of the first client data has become unavailable;

determining that at least one of the supported items relies on the portion of the first client data;

sending second GUI data to the client instance, wherein display of the second GUI data excludes the at least one of the supported items;

receiving, from the client instance, a query that requests values spanning both the first portion and the second portion; and responsive to receiving the query, dividing the query into a plurality of data requests, the plurality of data requests including a first request with respect to the first portion and a second request with respect to the second portion.

15. The apparatus of claim 14, wherein the operations further comprising identifying different supported items for client data associated with different enterprise clients.

16. The apparatus of claim 14, wherein the operations further comprise identifying different supported items for different users associated with the same enterprise client.

17. The apparatus of claim 14, wherein a item in the set of items is associated with at least one term, at least one question, at least one model, at least one business measure, or any combination thereof.

18. The apparatus of claim 14, wherein the stored set of computable content measures is reusable to identify the supported items while the first client data remains available and while the at least one of the role or the security access level of the user is unchanged.

* * * * *